(12) United States Patent
Raju et al.

(10) Patent No.: US 12,516,612 B2
(45) Date of Patent: Jan. 6, 2026

(54) METHODS AND APPARATUS TO MITIGATE MOVEMENT BETWEEN COMPRESSOR CASING SEGMENTS

(71) Applicant: General Electric Company, Evendale, OH (US)

(72) Inventors: Mohan Kannaiah Raju, Bengaluru (IN); Kudum Shinde, Bengaluru (IN); Utsav Vijaykumar Soni, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/942,089

(22) Filed: Nov. 8, 2024

(65) Prior Publication Data

US 2025/0297557 A1   Sep. 25, 2025

(30) Foreign Application Priority Data

Mar. 21, 2024  (IN) .............................. 202411021604

(51) Int. Cl.
*F01D 25/24* (2006.01)

(52) U.S. Cl.
CPC ........ *F01D 25/243* (2013.01); *F05D 2260/31* (2013.01)

(58) Field of Classification Search
CPC ...... F01D 25/24; F01D 25/243; F01D 25/246; F01D 25/26; F05D 2260/31; F05D 2260/38
See application file for complete search history.

(56) References Cited

U.S. PATENT DOCUMENTS

| | | | | |
|---|---|---|---|---|
| 4,529,355 A | * | 7/1985 | Wilkinson | ............ F01D 11/005 |
| | | | | 415/173.1 |
| 4,565,492 A | * | 1/1986 | Bart | ........................ F01D 11/18 |
| | | | | 415/138 |

(Continued)

FOREIGN PATENT DOCUMENTS

| | | |
|---|---|---|
| CN | 110966261 B | 9/2021 |
| EP | 1398474 B1 | 1/2008 |
| GB | 712351 A | 7/1954 |

*Primary Examiner* — Nathaniel E Wiehe
*Assistant Examiner* — Maxime M Adjagbe
(74) *Attorney, Agent, or Firm* — Hanley, Flight & Zimmerman, LLC (57) ABSTRACT

Methods and apparatus to mitigate movement between compressor casing segments are disclosed. An example compressor casing comprises a first annular casing segment, a second annular casing segment surrounding the first segment, the second segment including an opening through a first surface and a second surface of the second segment, the first surface facing the first segment, a cylindrical body extending between the first and second segments, a first end of the cylindrical body attached to the first segment, a second end of the cylindrical body positioned within the opening of the second segment, the second end of the cylindrical body held in compression within the opening, and a spring surrounding the cylindrical body, the spring aligned to a longitudinal axis of the cylindrical body, the spring positioned between the first and second annular casing segments, the spring to resist movement between the first and second annular casing segments.

17 Claims, 6 Drawing Sheets

(56) References Cited

U.S. PATENT DOCUMENTS

| | | | | |
|---|---|---|---|---|
| 5,354,174 A | * | 10/1994 | Balkcum | F01D 25/246 |
| | | | | 415/189 |
| 8,075,261 B2 | | 12/2011 | Merry et al. | |
| 8,662,838 B2 | | 3/2014 | Ferrer et al. | |
| 9,528,441 B2 | | 12/2016 | Cretin et al. | |
| 10,329,930 B2 | * | 6/2019 | Roussille | F01D 25/246 |
| 10,815,892 B2 | | 10/2020 | Brault et al. | |
| 10,927,696 B2 | | 2/2021 | Eckett et al. | |
| 2017/0081978 A1 | * | 3/2017 | Fitzpatrick | F02C 3/04 |

* cited by examiner

METHODS AND APPARATUS TO MITIGATE MOVEMENT BETWEEN COMPRESSOR CASING SEGMENTS

RELATED APPLICATIONS

This patent claims the benefit of Indian Provisional Patent Application No. 202411021604, which was filed on Mar. 21, 2024. Indian Provisional Patent Application No. 202411021604 is hereby incorporated by reference in its entirety. Priority to Indian Provisional Patent Application No. 202411021604 is hereby claimed.

FIELD OF THE DISCLOSURE

This disclosure relates generally to turbofan engines and, more particularly, to methods and apparatus to mitigate movement between compressor casing segments.

BACKGROUND

Turbofan engines, such as those used on aircraft, generally include a fan, a gas turbine engine to drive the fan, and an outer bypass duct. The gas turbine engine includes a compressor section, a combustor, and a turbine section in a serial flow arrangement. The compressor section compresses and delivers air downstream to the combustor.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Vibrations in an aircraft may damage the aircraft, the pylons connecting the engine to the aircraft, the engine itself, or any other component on the aircraft. For example, compressor sections of aircraft engines include rotor blades moving with a compressor case to compress air. Vibration may result from a rotor blade coming into contact with the compressor case. In some examples, rubbing between the rotor blade and the compressor case may not only induce vibration to the compressor section, but may also cause blade tip losses that open clearances between the compressor case and rotor blades. Maintaining close tolerances between the rotors and the interior of the compressor case facilitates air compression. When these tolerances are compromised by blade tip losses, the compressor section may lose performance or efficiency within the engine.

Examples disclosed herein provide a damping mechanism to mitigate the vibrational effects of a compressor casing. Disclosed examples reduce or eliminate the vibrations between inner and outer annular compressor casing segments. For example, disclosed examples provide annular compressor casing segments with a radial stiffness that counteracts forces due to vibration during operation. As such, disclosed examples enable a compressor casing to withstand relatively high frequency modes (e.g., 650 Hertz (Hz)) as the radial stiffness (e.g., stiffness associated with a spring) increases. Further, disclosed examples maintain space (e.g., clearance, gaps, etc.) between the inner annular compressor casing and neighboring rotor blade tips. Disclosed examples enhance the compression efficiency of aircraft engine compressors by mitigating vibrations or ensuring clearance between rotor blade tips and compressor casings. For example, disclosed examples improve the specific fuel consumption (SFC) (e.g., requiring less fuel to deliver the given power) of an example aircraft engine by mitigating these vibrations.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

Figure 1:
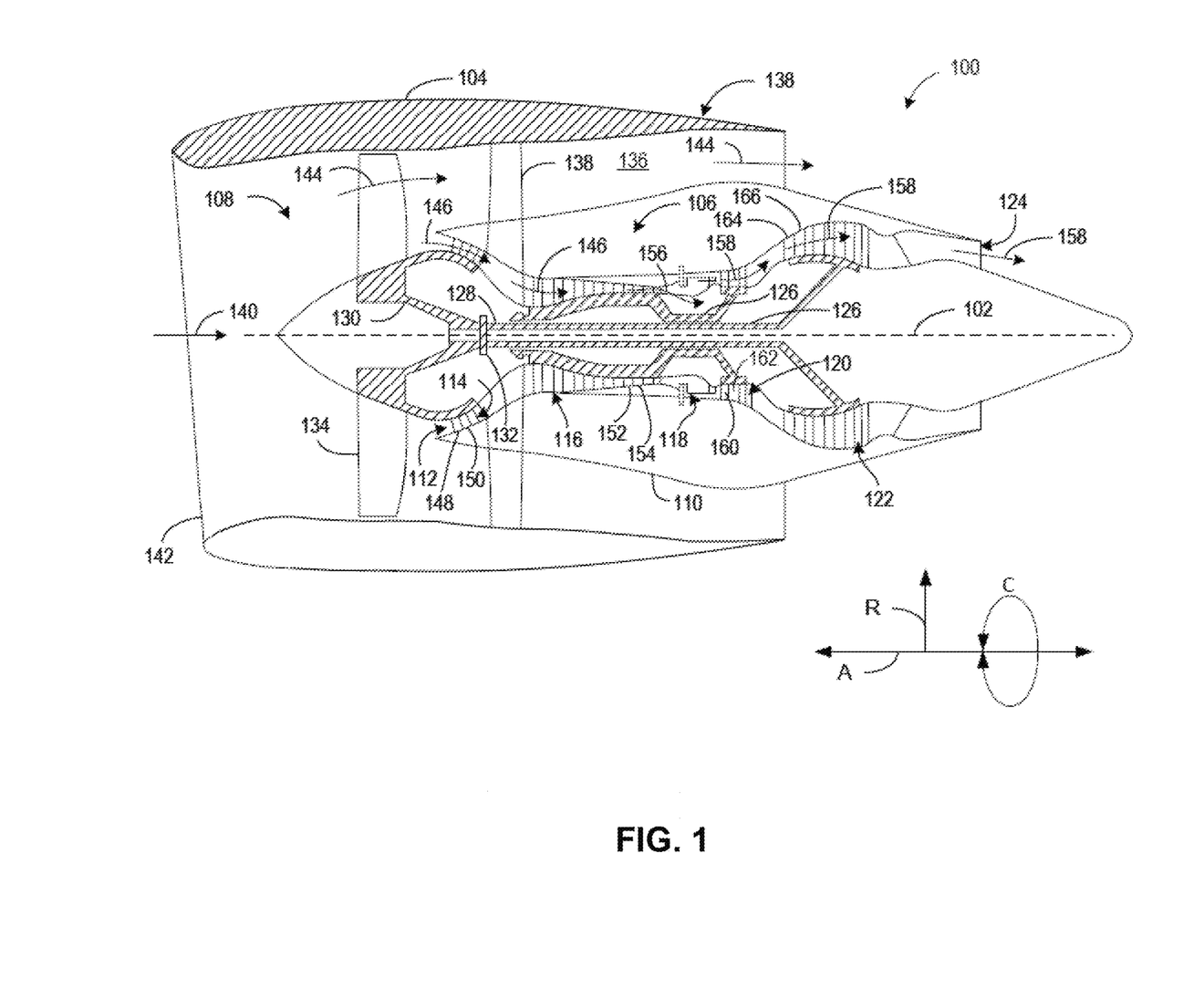
FIG. 1 is a schematic cross-sectional view of an example turbofan engine in which examples disclosed herein may be implemented.

FIG. 1 is a schematic cross-sectional view of an example high-bypass turbofan-type gas turbine engine 100 ("turbofan engine 100") that can incorporate various examples disclosed herein. While the illustrated example is a high-bypass turbofan engine, the principles of the present disclosure are also applicable to other types of engines, such as low-bypass turbofans, turbojets, turboprops, etc. The turbofan engine 100 includes an outer bypass duct 104 (which may also be referred to as a nacelle, fan duct, or outer casing), a gas turbine engine 106 (which may also be referred to as a core turbine engine or turbo-machinery), and a fan section 108. The gas turbine engine 106 and the fan section 108 are disposed at least partially in the outer bypass duct 104. The gas turbine engine 106 is disposed downstream from the fan section 108 and drives the fan section 108 to produce forward thrust. As shown in FIG. 1, the turbofan engine 100 or the gas turbine engine 106 define a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outwardly from the centerline axis 102, and the circumferential direction C is a direction that extends concentrically around the centerline axis 102.

The gas turbine engine 106 includes a substantially tubular outer casing 110 (which may also be referred to as a mid-casing) that defines an annular inlet 112. The outer casing 110 of the gas turbine engine 106 can be formed from a single casing or a plurality of casings. The outer casing 110 encloses, in serial flow relationship, a compressor section having a booster or low pressure compressor 114 ("LP compressor 114") and a high pressure compressor 116 ("HP compressor 116"), a combustion section 118 (which may also be referred to as the combustor 118), a turbine section having a high pressure turbine 120 ("HP turbine 120") and a low pressure turbine 122 ("LP turbine 122"), and an exhaust section 124. A high pressure shaft or spool 126 ("HP shaft 126") drivingly couples the HP turbine 120 and the HP compressor 116. A low pressure shaft or spool 128 ("LP shaft 128") drivingly couples the LP turbine 122 and the LP compressor 114. The LP shaft 128 may also couple to a fan spool or shaft 130 of the fan section 108. In some examples, the LP shaft 128 may couple directly to the fan shaft 130 (i.e., a direct-drive configuration). In alternative configurations, the LP shaft 128 may couple to the fan shaft 130 via a reduction gearbox 132 (i.e., an indirect-drive or geared-drive configuration).

As shown in FIG. 1, the fan section 108 includes a plurality of fan blades 134 coupled to and extending radially outwardly from the fan shaft 130. The outer bypass duct 104 circumferentially encloses the fan section 108 or at least a portion of the gas turbine engine 106. In particular, the gas turbine engine is disposed in the outer bypass duct 104 such that a bypass airflow passage or duct 136 is formed between the outer casing 110 of the gas turbine engine 106 and the outer bypass duct 104. The outer bypass duct 104 may be supported relative to the gas turbine engine 106 by a plurality of circumferentially-spaced apart outlet guide vanes 138.

As illustrated in FIG. 1, during operation of the turbofan engine 100, air 140 enters an inlet portion 142 of the turbofan engine 100. The air 140 is accelerated by the fan blades 134. A first portion 144 of the air 140 flows into the bypass airflow passage 136, while a second portion 146 of the air 140 flows into the inlet 112 of the gas turbine engine 106 (and, thus, into the LP compressor 114). One or more sequential stages of LP compressor stator vanes 148 and LP compressor rotor blades 150 coupled to the LP shaft 128 progressively compress the second portion 146 of the air 140 flowing through the LP compressor 114 en route to the HP compressor 116. Next, one or more sequential stages of HP compressor stator vanes 152 and HP compressor rotor blades 154 coupled to the HP shaft 126 further compress the second portion 146 of the air 140 flowing through the HP compressor 116. This provides compressed air 156 to the combustion section 118 where it mixes with fuel and burns to provide combustion gases 158.

The combustion gases 158 flow through the HP turbine 120 where one or more sequential stages of HP turbine stator vanes 160 and HP turbine rotor blades 162 coupled to the HP shaft 126 extract a first portion of kinetic or thermal energy therefrom. This energy extraction supports operation of the HP compressor 116. The combustion gases 158 then flow through the LP turbine 122 where one or more sequential stages of LP turbine stator vanes 164 and LP turbine rotor blades 166 coupled to the LP shaft 128 extract a second portion of thermal or kinetic energy therefrom. This energy extraction causes the LP shaft 128 to rotate, thereby supporting operation of the LP compressor 114 or rotation of the fan shaft 130. The combustion gases 158 then exit the gas turbine engine 106 through the exhaust section 124 thereof. The combustion gases 158 mix with the first portion 144 of the air 140 from the bypass airflow passage 136 to produce propulsive thrust.

Along with the turbofan engine 100, the gas turbine engine 106 serves a similar purpose and sees a similar environment in land-based gas turbines, turbojet engines in which the ratio of the first portion 144 of the air 140 to the second portion 146 of the air 140 is less than that of a turbofan, and unducted fan engines in which the fan section 108 is devoid of the outer bypass duct 104. In each of the turbofan, turbojet, and unducted engines, a speed reduction device (e.g., the reduction gearbox 132) may be included between any shafts and spools. For example, the reduction gearbox 132 may be disposed between the LP shaft 128 and the fan shaft 130 of the fan section 108.

Figure 2A:
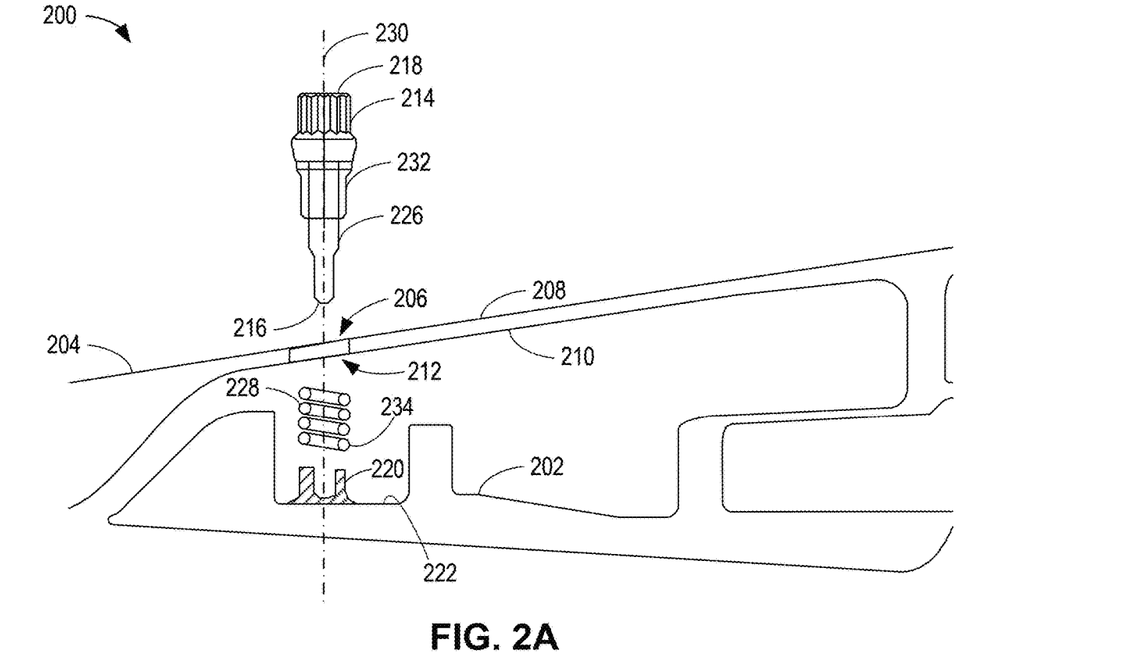
FIG. 2A is an enlarged cross-sectional view of a portion of an example compressor of an example gas turbine engine constructed in accordance with examples disclosed herein.
Figure 2B:
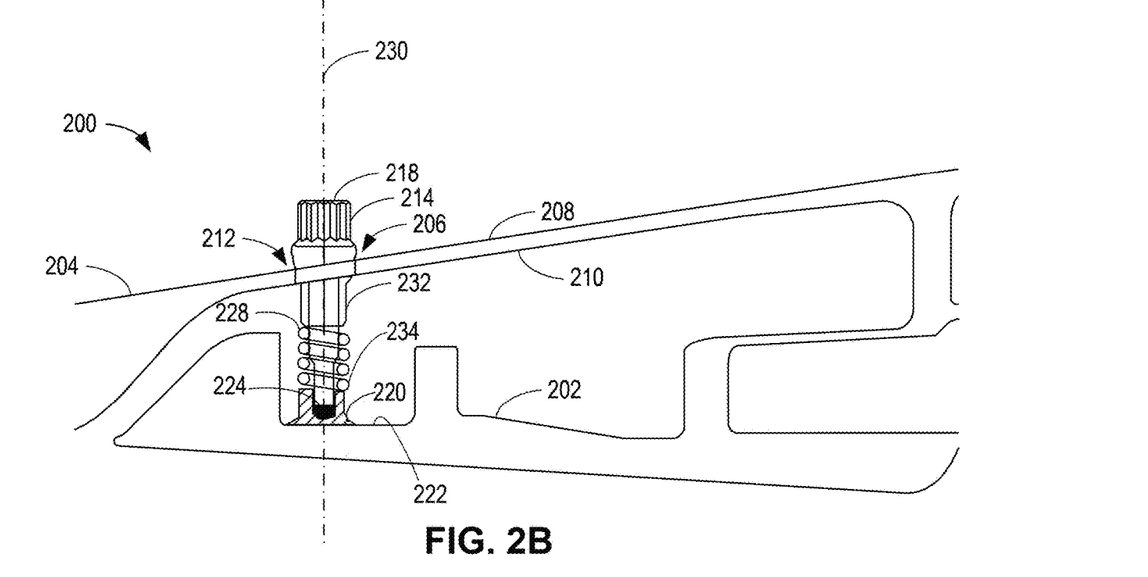
FIG. 2B is another enlarged cross-sectional view of the portion of the example compressor of FIG. 2A.

FIGS. 2A-2B are enlarged cross-sectional views of a portion of the HP compressor 116 of the gas turbine engine 106 of FIG. 1. The HP compressor 116 of the gas turbine engine 106 includes an example compressor casing 200 having an inner annular casing segment 202 surrounded by an outer annular casing segment 204. Thus, the outer annular casing segment 204 can be radially spaced apart from the inner annular casing segment 202. In some examples, the compressor casing 200 corresponds to the outer casing 110 (FIG. 1) or a portion of the outer casing 110. The inner annular casing segment 202 and the outer annular casing segment 204 can be coupled by one or more walls or sections of the compressor casing 200. As shown in FIGS. 2A and 2B, the inner and outer annular casing segments 202, 204 are spaced apart such that one or more cavities or chambers are formed between the inner and outer annular casing segments 202, 204. The inner annular casing segment 202 defines, forms, or otherwise surrounds a passageway for airflow through the HP compressor 116 to the combustion section 118 (FIG. 1). In some examples, stator vanes (e.g., the stator vanes 152 in FIG. 1) are coupled to and extend radially inward from the inner annular casing segment 202. Further, rotor vanes (e.g., the rotor vanes 154 in FIG. 1) are coupled and extend radially outward towards the inner annular casing segment 202 (e.g., radially outward from the HP shaft 126 in FIG. 1).

FIG. 2A illustrates an example exploded view of the compressor casing 200. FIG. 2B illustrates an example assembled view of the compressor casing 200. In the example of FIGS. 2A and 2B, the outer annular casing segment 204 includes an opening 206 extending through opposing surfaces 208, 210 of the outer annular casing segment 204. The example surface 210 faces the inner annular casing segment 202. Further, an example capture mechanism 212 is attached to walls of the opening 206 to retain a cylindrical body (e.g., elongated member, elongated bolt, bolt shank, etc.) 214, as described in detail in connection with FIG. 4. The example cylindrical body 214 extends between the inner and outer annular casing segments 202, 204. In some examples, the cylindrical body 214 connects (e.g., couples) the casing segments 202, 204. An example first end 216 of the cylindrical body 214 is attached (e.g., fixed, coupled, fixedly coupled, etc.) to the inner annular casing segment 202. Further, an example second end 218 of the cylindrical body 214 is positioned within the opening 206. In other words, the second end 218 can extend through the opening 206 (e.g., protruding radially away from the surface 208). In the example of FIG. 2B, the second end 218 of the cylindrical body 214 is held in compression within the opening 206 (described in detail in connection with FIG. 4).

The inner annular casing segment 202 includes a seat 220 positioned a surface (e.g., an outer surface) 222 of the inner annular casing segment 202. As shown in FIGS. 2A and 2B, the surface 222 of the inner annular casing segment 202 faces the surface 210 of the outer annular casing segment 204. In some examples, the seat 220 is bolted or otherwise attached to the surface 222 of the inner annular casing segment 202. Further, the seat 220 is shaped/fitted to receive or retain the first end 216 of the cylindrical body 214. As such, the first end 216 of the cylindrical body 214 is in contact with the inner annular casing segment 202 via the seat 220. Furthermore, a damper 224 can be positioned within the seat 220 to separate the end of the cylindrical body 214 and the seat 220.

An example first portion 226 of the cylindrical body 214 is surrounded by an example spring (e.g., helical spring) 228. The example spring 228 is aligned to an example longitudinal axis 230 of the cylindrical body 214. As such, the spring 228 and the first portion 226 of the cylindrical body 214 are positioned between the inner and outer annular casing segments 202, 204 (as shown in the assembled view of FIG. 2B). Further, an example second portion 232 of the cylindrical body 214 is positioned between the spring 228 and the outer annular casing segment 204. The second portion 232 of the cylindrical body 214 is positioned closer to the outer annular casing segment 204 than the first portion 226 is to the outer annular casing segment 204. As such, the spring 228 can be sandwiched between the second portion 232 of the cylindrical body 214 and the seat 220. In this example, the second portion 232 of the cylindrical body 214 has a diameter greater in size than a diameter of the first portion 226 of the cylindrical body 214.

During operation, the inner annular casing segment 202 and the outer annular casing segment 204 can move relative to one another. For example, the inner annular casing segment 202 moves radially outward toward the outer annular casing segment 204. In such examples, the seat 220 (moving with the inner annular casing segment 202) applies a compressive force on the spring 228 (e.g., an end 234 of the spring 228). The spring 228, sandwiched between the seat 220 and the second portion 232 of the cylindrical body 214, compresses. However, the stiffness (e.g., spring constant) of the spring 228 allows the spring 228 to resist compression. The spring 228 can engage with the seat 220 and the second portion 232 of the cylindrical body 214 to resist movement (e.g., radial movement) between the casing segments 202, 204. For example, the spring 228 engages with the seat 220 and the cylindrical body 214 to separate the casing segments 202, 204.

Figure 3A:
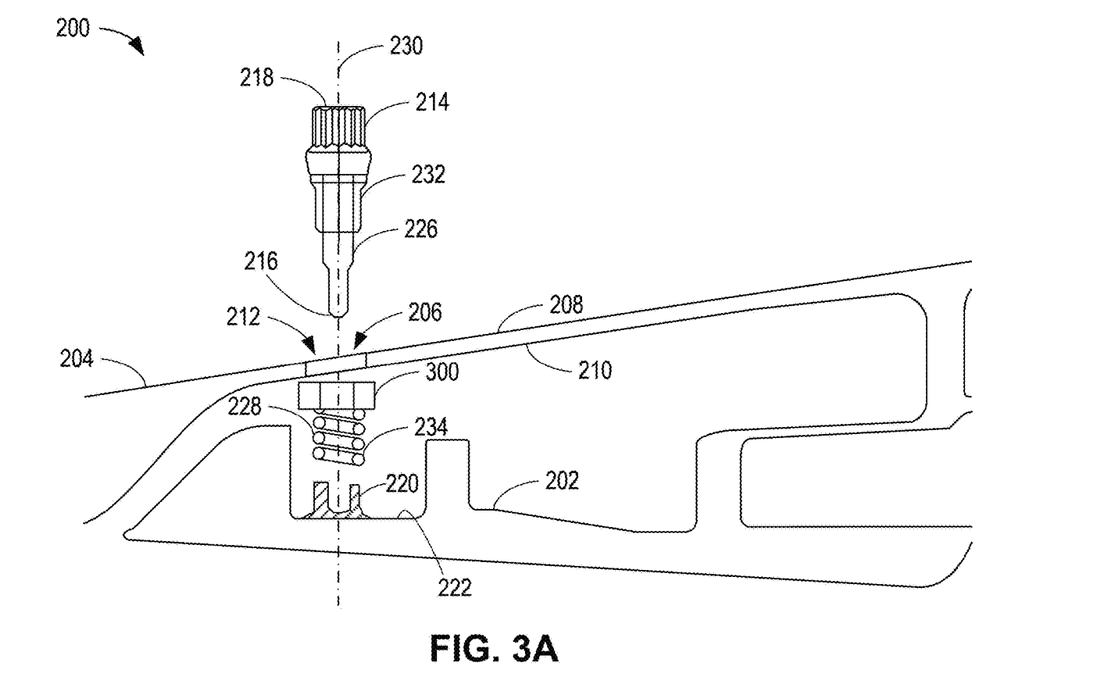
FIG. 3A illustrates another example implementation of the portion of the example compressor of FIGS. 2A-2B.
Figure 3B:
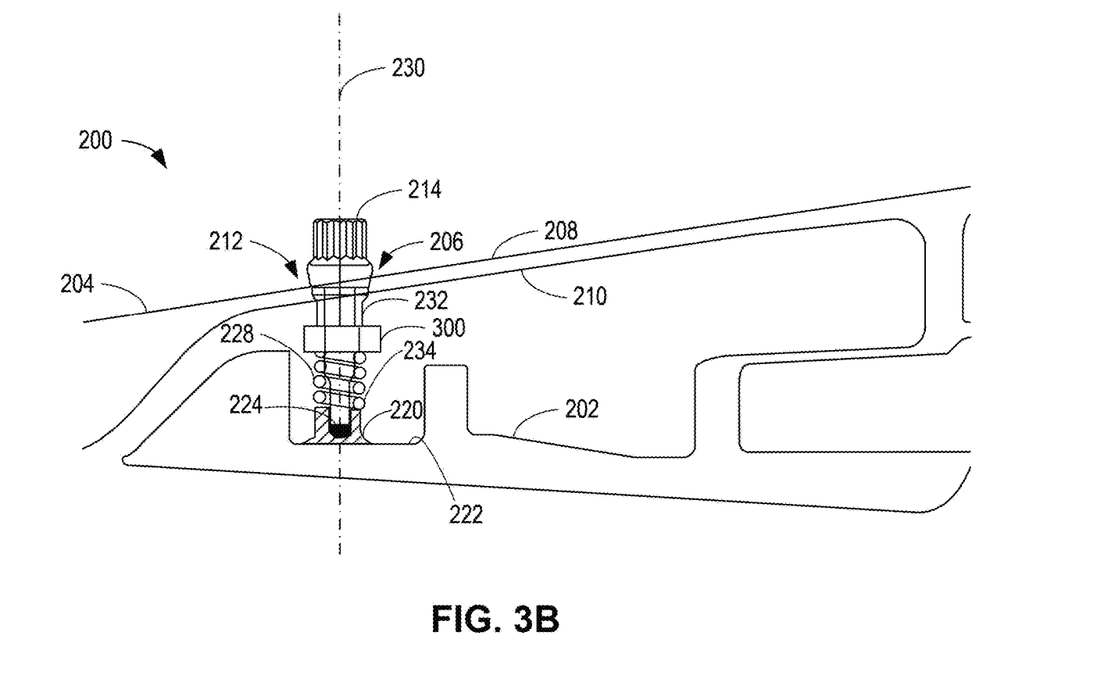
FIG. 3B is another view of the example implementation of FIG. 3A.

Turning to FIGS. 3A and 3B, the example compressor casing 200 can include an example nut 300 to alter, refine, or change the stiffness of the spring 228 (e.g., "tuning" the spring). The nut 300 can be positioned on the spring 228, which increases the stiffness of the spring 228. In particular, the nut 300 can be torqued (e.g., tightened) on the spring 228 to compress or load the spring 228 (e.g., towards the inner annular casing segment 202). As such, the nut 300 can act as a tuning device to tune the spring through pre-compression, for example. In some examples, increasing the stiffness of the spring 228 can reduce the vibrational frequency associated with at least one of the outer annular casing segment 204 or the inner annular casing segment 202. In some examples, the nut 300 surrounds the cylindrical body 214. For example, the nut 300 can be cylindrically shaped such that the nut 300 encircles an outer surface of the cylindrical body 214. As shown in the example of FIGS. 3A and 3B, the nut 300 can be aligned with the longitudinal axis 230 of the cylindrical body 214.

Figure 4:
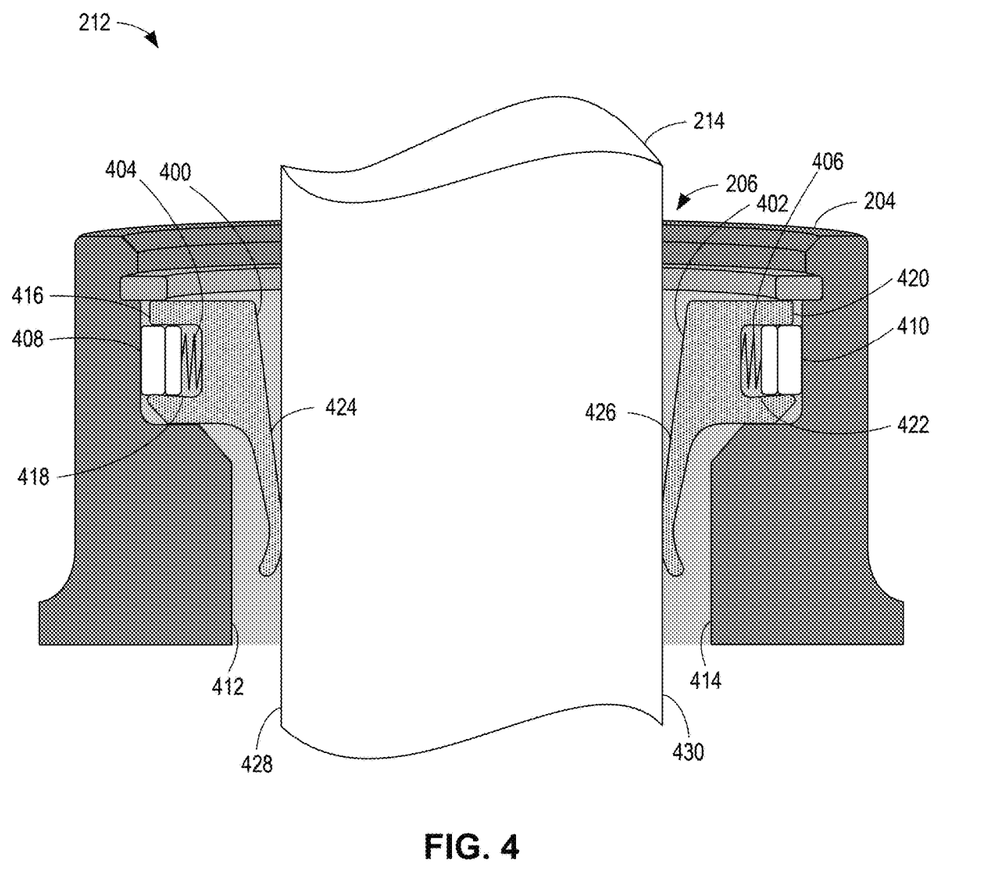
FIG. 4 is an enlarged cross-sectional view of an example capture mechanism associated with the example compressor of FIG. 2B.

FIG. 4 is a detailed view of the capture mechanism 212 described in connection with FIGS. 2A-3B. The example capture mechanism 212 includes the outer annular casing segment 204, the opening 206, the cylindrical body 214, retainers 400, 402, springs 404, 406, and piston rings 408, 410. In the example of FIG. 4, the retainers 400, 402 can be brackets, arms, grips, etc. For example, the retainer 400 (also referred to as a bracket 400) extends from a first wall 412 of the opening 206 towards a second wall 414 of the opening 206. Further, the retainer 402 (also referred to as a bracket 402) extends from the second wall 414 towards the first wall 412 (e.g., the first wall 412 facing the second wall 414). In such an example, the cylindrical body 214 is held in compression within the opening 206 via the brackets 400, 402.

In FIG. 4, the spring 404 is positioned between the bracket 400 and the first wall 412. An example surface 416 of the bracket 400 includes a cavity 418 shaped to receive the spring 404. The example surface 416 faces the first wall 412. The piston ring 408 separates the spring 404 from the first wall 412. As shown, the cavity 418 is shaped to receive (e.g., at least partially enclose) the piston ring 408. Similarly, the spring 406 is positioned between the bracket 402 and the second wall 414. An example surface 420 of the bracket 402 includes a cavity 422 shaped to receive the spring 406. The example surface 420 faces the second wall 414. The piston ring 410 separates the spring 406 from the second wall 414. As shown, the cavity 422 is shaped to receive the piston ring 410.

In some examples, the brackets 400, 402 include curved surfaces 424, 426 that contact sides 428, 430 of the cylindrical body 214, respectively. For example, the curved surface 424 of the bracket 400 is in contact with (e.g., aligned with, follow a shape of, etc.) the side 428 of the cylindrical body 214. The side 428 of the cylindrical body 214 faces the first wall 412. Similarly, the curved surface 426 of the bracket 402 is in contact with (e.g., aligned with, follow a shape of, etc.) the side 430 of the cylindrical body 214. The side 430 of the cylindrical body 214 faces the second wall 414. In some examples, the brackets 400, 402 are two of a plurality of brackets (e.g., 5 brackets, 7 brackets, etc.) that surround an example outer surface of the cylindrical body 214.

In other examples, the retainers 400, 402 are a sleeve, sleeve portions, a funnel, etc. For example, the retainers 400, 402 can form sleeve portions that at least partially surround (e.g., surround, completely surround, etc.) the cylindrical body 214. In particular, the sleeve portions can form an annular sleeve (e.g., a conical sleeve, a tube-shaped sleeve, a sliding joint, etc.) having an inner annular surface (e.g., the curved surface 424, the curved surface 426, etc.) and an outer annular surface (e.g., the surface 416, the surface 420, etc.). The annular sleeve can taper in a direction from the outer annular casing segment 204 to the inner annular casing segment 202 (FIGS. 2A-2B).

As shown in FIG. 4, a portion of the inner annular surface is in contact with the cylindrical body 214. Further, the outer annular surface can include the cavities 418, 422 shaped to receive the springs 404, 406 and the piston rings 408, 410. Thus, the outer annular surface can be in contact with the springs 404, 406. The springs 404, 406 or a plurality of springs 404, 406 can be positioned between the first and second walls 412, 414 of the opening 206 and the outer annular surface. As such, the springs 404, 406 and the sleeve portions can hold the cylindrical body 214 in compression within the opening 206.

Figure 5:
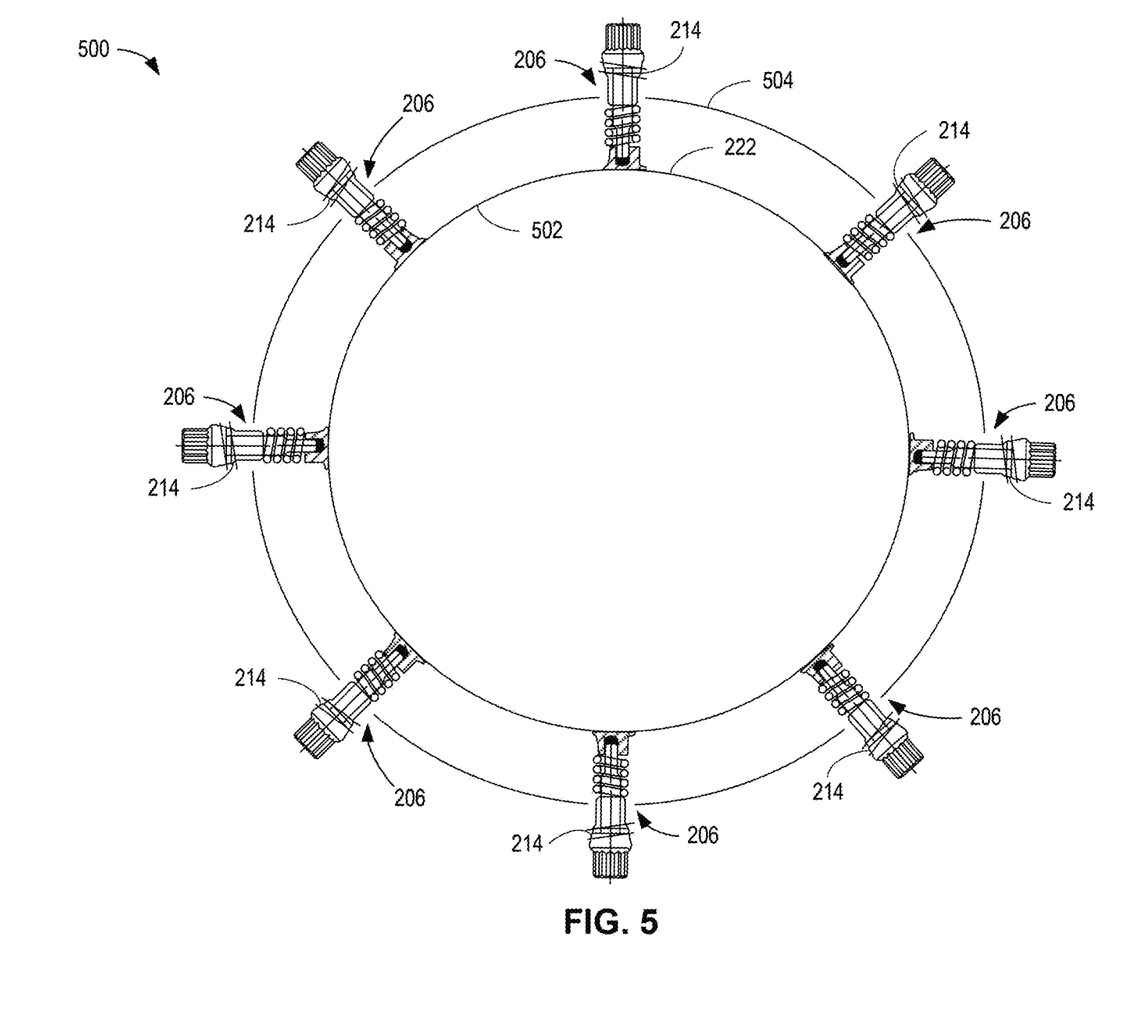
FIG. 5 illustrates an example assembly of a plurality of the compressor casing segments of FIG. 2B.

FIG. 5 illustrates an example assembly 500 of a plurality of the casing segments 202, 204 of FIG. 2B. The example assembly 500 includes an inner annular compressor casing 502 (e.g., including a plurality of inner annular casing segments 202) surrounded by an outer annular compressor casing 504 (e.g., including a plurality of outer annular casing segments 204). The outer annular compressor casing 504 includes a plurality of openings 206. As shown in FIG. 4, the openings 206 are circumferentially spaced apart along the outer annular compressor casing 504. The example inner annular compressor casing 502 includes cylindrical bodies 214 attached to the outer surface 222 of the inner annular compressor casing 502. The example cylindrical bodies 214 extend radially away from the outer surface 222 towards the outer annular compressor casing 504. Further, the example cylindrical bodies 214 extend through corresponding openings 206. Similar to the examples of FIGS. 2A-4, the cylindrical bodies 214 engage with walls (e.g., the first and second walls 412, 414, the retainers 400, 402, etc.) of the openings 206 to resist movement between the outer annular compressor casing 504 and the inner annular compressor casing 502.

Figure 6:
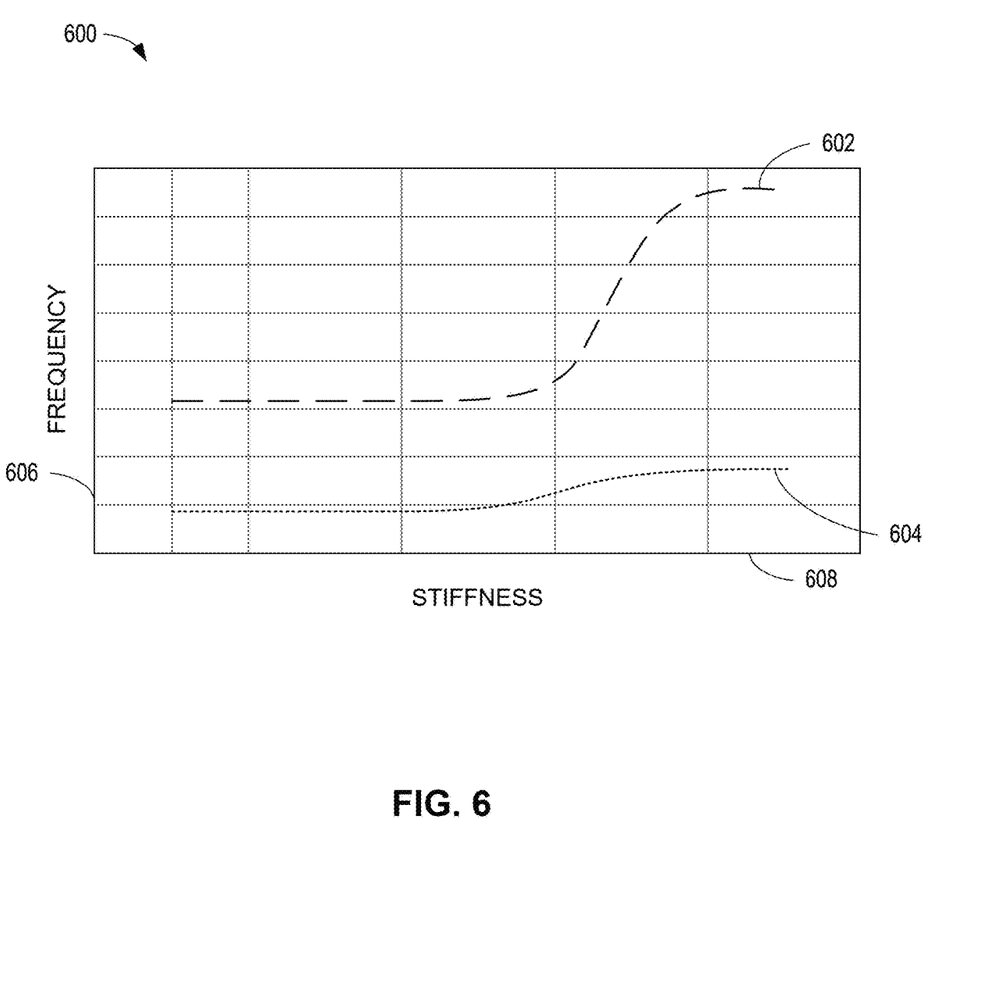
FIG. 6 is a graph that describes vibrational frequency of an example compressor casing as a function of spring stiffness.

FIG. 6 includes an example graph 600 that describes the vibrational frequency of an example compressor casing (e.g., the compressor casing 200 of FIGS. 2A-2B) as a function of spring stiffness (e.g., stiffness of the spring 228 of FIGS. 2A-2B). During operation, a vibrational frequency associated with the compressor casing 200 can be detected when the outer annular casing segment 204 and the inner annular casing segment 202 move towards one another (e.g., repeatedly cycle, vibrate, etc.). In some examples, this vibrational frequency can be mitigated by adjusting the stiffness of the spring 228. For example, plots 602, 604 illustrate how the compressor casing 200 can withstand higher vibrational frequencies (e.g., 650 Hz) as the stiffness of the spring 228 increases. A first example axis 606 indicates frequencies of the vibrations (e.g., in a range from about 0 Hz to about 750 Hz). A second example axis 608 indicates the stiffness of the spring 228 (e.g., in a range from log (0) to log (9)).

In some examples, the compressor casing 200 of FIGS. 2A and 2B include first means for surrounding. For example, the first means for surrounding may be implemented by the inner annular casing segment 202 of FIGS. 2A and 2B or the inner annular compressor casing 502 of FIG. 5.

In some examples, the compressor casing 200 of FIGS. 2A and 2B include second means for surrounding. For example, the second means for surrounding may be implemented by the outer annular casing segment 204 of FIGS. 2A and 2B or the outer annular compressor casing 504 of FIG. 5.

In some examples, the compressor casing 200 of FIGS. 2A and 2B include first means for accessing. For example, the first means for accessing may be implemented by the opening 206 of FIGS. 2A and 2B or the openings 206 of FIG. 5.

In some examples, the compressor casing 200 of FIGS. 2A and 2B include first means for supporting. For example, the first means for supporting may be implemented by the surface 208 of the outer annular compressor casing 204 of FIGS. 2A and 2B.

In some examples, the compressor casing 200 of FIGS. 2A and 2B include second means for supporting. For example, the second means for supporting may be implemented by the surface 210 of the outer annular compressor casing 204 of FIGS. 2A and 2B.

In some examples, the compressor casing 200 of FIGS. 2A and 2B include means for connecting. For example, the means for connecting may be implemented by the cylindrical body 214 of FIGS. 2A and 2B.

In some examples, the compressor casing 200 of FIGS. 2A and 2B include first means for retaining. For example, the first means for retaining may be implemented by the spring 228 of FIGS. 2A and 2B.

In some examples, the compressor casing 200 of FIGS. 2A and 2B include means for aligning. For example, the means for aligning may be implemented by the longitudinal axis 230 of FIGS. 2A and 2B.

In some examples, the compressor casing 200 of FIGS. 2A and 2B include means for retaining. For example, the means for retaining may be implemented by the seat 220 of FIGS. 2A and 2B.

In some examples, the compressor casing 200 of FIGS. 2A and 2B include third means for supporting. For example, the third means for supporting may be implemented by the surface 222 of the inner annular casing segment 202 of FIGS. 2A and 2B.

In some examples, the compressor casing 200 of FIGS. 2A and 2B include means for dampening. For example, the means for dampening may be implemented by the damper 224 of FIGS. 2A and 2B.

In some examples, the compressor casing 200 of FIGS. 2A and 2B include first means for securing. For example, the first means for securing may be implemented by the bracket 400 of FIG. 4.

In some examples, the compressor casing 200 of FIGS. 2A and 2B include second means for securing. For example, the second means for securing may be implemented by the bracket 402 of FIG. 4.

In some examples, the compressor casing 200 of FIGS. 2A and 2B include fourth means for supporting. For example, the fourth means for supporting may be implemented by the first wall 412 of the opening 206 in FIG. 4.

In some examples, the compressor casing 200 of FIGS. 2A and 2B include fifth means for supporting. For example, the fifth means for supporting may be implemented by the second wall 414 of the opening 206 in FIG. 4.

In some examples, the compressor casing 200 of FIGS. 2A and 2B include second means for retaining the cylindrical body 214. For example, the second means for retaining may be implemented by the spring 404 of FIG. 4.

In some examples, the compressor casing 200 of FIGS. 2A and 2B include third means for retaining the cylindrical body 214. For example, the third means for retaining may be implemented by the spring 406 of FIG. 4.

In some examples, the compressor casing 200 of FIGS. 2A and 2B include first means for sealing. For example, the first means for sealing may be implemented by the piston ring 408 of FIG. 4.

In some examples, the compressor casing 200 of FIGS. 2A and 2B include second means for sealing. For example, the second means for sealing may be implemented by the piston ring 410 of FIG. 4.

In some examples, the compressor casing 200 of FIGS. 2A and 2B include sixth means for supporting. For example, the sixth means for supporting may be implemented by the surface 416 of the bracket 400 in FIG. 4.

In some examples, the compressor casing 200 of FIGS. 2A and 2B include seventh means for supporting. For example, the seventh means for supporting may be implemented by the surface 420 of the bracket 402 in FIG. 4.

In some examples, the compressor casing 200 of FIGS. 2A and 2B include second means for accessing. For example, the second means for accessing may be implemented by the cavity 418 in the bracket 400 of FIG. 4.

In some examples, the compressor casing 200 of FIGS. 2A and 2B include third means for accessing. For example, the third means for accessing may be implemented by the cavity 422 in the bracket 402 of FIG. 4.

In some examples, the compressor casing 200 of FIGS. 2A and 2B include first curved means for supporting. For example, the first curved means for supporting may be implemented by the curved surface 424 of the bracket 400 in FIG. 4.

In some examples, the compressor casing 200 of FIGS. 2A and 2B include second curved means for supporting. For example, the second curved means for supporting may be implemented by the curved surface 426 of the bracket 402 in FIG. 4.

From the foregoing, it will be appreciated that example systems, apparatus, articles of manufacture, and methods have been disclosed that mitigate the vibrational effects induced, for example, by rubbing between the rotor blade and the compressor case. This rubbing may also cause blade tip losses that open clearances between the compressor case and rotor blades. Disclosed examples reduce or eliminate the vibrations between inner and outer annular compressor casing segments. For example, disclosed examples provide annular compressor casing segments with a radial stiffness that counteracts forces due to vibration during operation. As such, disclosed examples enable a compressor casing to withstand relatively high frequency modes (e.g., 650 Hz) as the radial stiffness increases. Further, disclosed examples maintain space (e.g., clearance, gaps, etc.) between the inner annular compressor casing and neighboring rotor blade tips. Disclosed examples enhance the compression efficiency of aircraft engine compressors by mitigating vibrations or ensuring clearance between rotor blade tips and compressor casings. For example, disclosed examples improve the SFC of an example aircraft engine by mitigating these vibrations.

Further aspects of the present disclosure are provided by the subject matter of the following clauses.

A compressor casing comprising a first annular casing segment, a second annular casing segment surrounding the first annular casing segment, the second annular casing segment defining an opening through a first surface and a second surface of the second annular casing segment, the first surface and the second surface opposing each other, the first surface facing the first annular casing segment, a cylindrical body extending between the first and second annular casing segments, a first end of the cylindrical body attached to the first annular casing segment, a second end of the cylindrical body positioned within the opening of the second annular casing segment, the second end of the cylindrical body held in compression within the opening, and a spring surrounding the cylindrical body, the spring aligned to a longitudinal axis of the cylindrical body, the spring positioned between the first and second annular casing segments, the spring resisting movement between the first and second annular casing segments.

The compressor casing of any preceding clause, further including a seat positioned on a surface of the first annular casing segment, the surface of the first annular casing segment facing the first surface of the second annular casing segment, the seat fitted to receive the first end of the cylindrical body.

The compressor casing of any preceding clause, further including a damper separating the first end of the cylindrical body and the seat.

The compressor casing of any preceding clause, wherein the spring surrounds a first portion of the cylindrical body, the spring positioned between the seat and a second portion of the cylindrical body, the second portion of the cylindrical body positioned closer to the second annular casing segment than the first portion of the cylindrical body is to the second annular casing segment, the spring engaging with the seat and the second portion of the cylindrical body to resist radial movement between the first and second annular casing segments.

The compressor casing of any preceding clause, further including a first bracket extending from a first wall of the opening towards a second wall of the opening, and a second bracket extending from the second wall towards the first wall, the cylindrical body held in compression by the first and second brackets.

The compressor casing of any preceding clause, wherein the spring is a first spring, the compressor casing further including a second spring positioned between the first bracket and the first wall and a third spring positioned between the second bracket and the second wall.

The compressor casing of any preceding clause, further including a first piston ring separating the second spring from the first wall and a second piston ring separating the third spring from the second wall.

The compressor casing of any preceding clause, wherein a surface of the first bracket faces the first wall and a surface of the second bracket faces the second wall, the surface of the first bracket having a first cavity shaped to receive the second spring and the first piston ring, the surface of the second bracket having a second cavity shaped to receive the third spring and the second piston ring.

The compressor casing of any preceding clause, wherein the first bracket includes a first curved surface to contact a first side of the cylindrical body and the second bracket includes a second curved surface to contact a second side of the cylindrical body, the first side facing the first wall of the opening, the second side facing the second wall of the opening.

The compressor casing of any preceding clause, wherein the first and second brackets are included in a plurality of brackets, the plurality of brackets surrounding an outer surface of the cylindrical body.

A compressor casing comprising a first casing segment, a second casing segment radially spaced apart from the first casing segment, the second casing segment defining a cavity extending through the second casing segment, an elongated member connecting the first casing segment to the second casing segment, a first end of the elongated member fixedly coupled to the first casing segment, a second end of the elongated member extending through the cavity of the second casing segment, and a helical spring positioned to surround a portion of the elongated member, the portion of the elongated member positioned between the first and second casing segments, the helical spring engaging with the elongated member to separate the first casing segment and the second casing segment.

The compressor casing of any preceding clause, further including a seat positioned on a surface of the first casing segment, the surface of the first casing segment facing the second casing segment, the seat shaped to receive an end of the elongated member.

The compressor casing of any preceding clause, further including a damper separating the end of the elongated member and the seat.

The compressor casing of any preceding clause, wherein the portion of the elongated member is a first portion, the helical spring positioned between the seat and a second portion of the elongated member, the second portion of the elongated member positioned closer to the second casing segment than the first portion of the elongated member is to the second casing segment, the helical spring engaging with the seat and the second portion of the elongated member to resist radial movement between the first and second casing segments.

The compressor casing of any preceding clause, further including a sleeve portion positioned in the cavity, the sleeve portion at least partially surrounding the elongated member, the sleeve portion retaining the elongated member within the cavity.

The compressor casing of any preceding clause, wherein the helical spring is a first spring, the compressor casing further including a second spring positioned between a first wall of the cavity and the sleeve portion, and a third spring positioned between a second wall of the cavity and the sleeve portion, the second wall facing the first wall, the elongated member held in compression by the sleeve portion and the second and third springs.

The compressor casing of any preceding clause, wherein the sleeve portion is an annular sleeve having an inner annular surface and an outer annular surface, a portion of the inner annular surface in contact with the elongated member, the outer annular surface in contact with the second and third springs.

The compressor casing of any preceding clause, wherein the cavity is a first cavity, wherein the outer annular surface includes a second cavity and a third cavity, walls of the second cavity to partially enclose the second spring and walls of the third cavity to enclose the third spring.

The compressor casing of any preceding clause, further including a first piston ring separating the second spring from the first wall of the first cavity and a second piston ring separating the third spring from the second wall of the first cavity.

An apparatus comprising an outer annular compressor casing defining openings extending through the outer annular compressor casing, the openings circumferentially spaced apart along the outer annular compressor casing, and an inner annular compressor casing surrounded by the outer annular compressor casing, the inner annular compressor casing having elongated bolts attached to an outer surface of the inner annular compressor casing, the outer surface facing the outer annular compressor casing, the elongated bolts extending radially away from the outer surface towards the outer annular compressor casing, the elongated bolts extending through corresponding ones of the openings, the elongated bolts engaging with walls of the openings to resist movement between the outer annular compressor casing and the inner annular compressor casing.

A compressor casing comprising first means for surrounding, second means for surrounding to surround the first means for surrounding, the second means for surrounding including a means for accessing to extend through a first means for supporting and a second means for supporting of the second means for surrounding, the first means for supporting and the second means for supporting opposing each other, the first means for supporting facing the first means for surrounding, means for connecting to extend between the first and second means for surrounding, a first end of the means for connecting attached to the first means for surrounding, a second end of the means for connecting positioned within the means for accessing of the second means for surrounding, the second end of the means for connecting held in compression within the means for accessing, and means for retaining surrounding the means for connecting, the means for retaining aligned to a means for aligning of the means for connecting, the means for retaining positioned between the first and second means for surrounding, the means for retaining to resist movement between the first and second means for surrounding.

The compressor casing of any preceding clause, further including a means for receiving positioned on a third means for supporting of the first means for surrounding, the surface of the first means for surrounding facing the first means for supporting of the second means for surrounding, the means for receiving fitted to receive the first end of the means for connecting.

The compressor casing of any preceding clause, further including a means for dampening separating the first end of the means for connecting and the means for receiving.

The compressor casing of any preceding clause, wherein the means for retaining surrounds a first portion of the means for connecting, the means for retaining positioned between the means for receiving and a second portion of the means for connecting, the second portion of the means for connecting positioned closer to the second means for surrounding than the first portion of the means for connecting is to the second means for surrounding, the means for retaining to engage with the means for receiving and the second portion of the means for connecting to resist radial movement between the first and second means for surrounding.

The compressor casing of any preceding clause, further including first means for securing extending from a fourth means for supporting of the means for accessing towards a fifth means for supporting of the means for accessing, and second means for securing extending from the fifth means for supporting towards the fourth means for supporting, the means for connecting held in compression by the first and second means for securing.

The compressor casing of any preceding clause, wherein the means for retaining is a first means for retaining, further including a second means for retaining positioned between the first means for securing and the fourth means for supporting and a third means for retaining positioned between the second means for securing and the fifth means for supporting.

The compressor casing of any preceding clause, further including a first means for sealing separating the second means for retaining from the fourth means for supporting and a second means for sealing separating the third means for retaining from the fifth means for supporting.

The compressor casing of any preceding clause, wherein the means for accessing is a first means for accessing, wherein a sixth means for supporting of the first means for securing faces the fourth means for supporting and a seventh means for supporting of the second means for securing faces the fifth means for supporting, the sixth means for supporting of the first means for securing having a second means for accessing shaped to receive the second means for retaining and the first means for sealing, the seventh means for supporting of the second means for securing having a third means for accessing shaped to receive the third means for retaining and the second means for sealing.

The compressor casing of any preceding clause, wherein the first means for securing includes a first curved means for supporting to contact a first side of the means for connecting and the second means for securing includes a second curved means for supporting to contact a second side of the means for connecting, the first side facing the fourth means for supporting of the means for accessing, the second side facing the fifth means for supporting of the means for accessing.

The compressor casing of any preceding clause, wherein the first and second means for securing are included in a plurality of means for securing, the plurality of means for securing to surround the means for connecting.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A compressor casing, comprising:
a first annular casing segment;
a second annular casing segment surrounding the first annular casing segment, the second annular casing segment defining an opening through a first surface and a second surface of the second annular casing segment, the first surface and the second surface opposing each other, the first surface facing the first annular casing segment;
a cylindrical body extending between the first and second annular casing segments, a first end of the cylindrical body attached to the first annular casing segment, a second end of the cylindrical body positioned within the opening of the second annular casing segment, the second end of the cylindrical body held in compression within the opening;
a spring surrounding the cylindrical body, the spring aligned to a longitudinal axis of the cylindrical body, the spring positioned between the first and second annular casing segments, the spring resisting movement between the first and second annular casing segments;
a first bracket extending from a first wall of the opening towards a second wall of the opening; and
a second bracket extending from the second wall towards the first wall, the cylindrical body held in compression by the first and second brackets.

2. The compressor casing of claim 1, further including a seat positioned on a surface of the first annular casing segment, the surface of the first annular casing segment facing the first surface of the second annular casing segment, the seat fitted to receive the first end of the cylindrical body.

3. The compressor casing of claim 2, further including a damper separating the first end of the cylindrical body and the seat.

4. The compressor casing of claim 2, wherein the spring surrounds a first portion of the cylindrical body, the spring positioned between the seat and a second portion of the cylindrical body, the second portion of the cylindrical body positioned closer to the second annular casing segment than the first portion of the cylindrical body is to the second annular casing segment, the spring engaging with the seat and the second portion of the cylindrical body to resist radial movement between the first and second annular casing segments.

5. The compressor casing of claim 1, wherein the spring is a first spring, the compressor casing further including a second spring positioned between the first bracket and the first wall and a third spring positioned between the second bracket and the second wall.

6. The compressor casing of claim 5, further including a first piston ring separating the second spring from the first wall and a second piston ring separating the third spring from the second wall.

7. The compressor casing of claim 6, wherein a surface of the first bracket faces the first wall and a surface of the second bracket faces the second wall, the surface of the first bracket having a first cavity shaped to receive the second spring and the first piston ring, the surface of the second bracket having a second cavity shaped to receive the third spring and the second piston ring.

8. The compressor casing of claim 1, wherein the first bracket includes a first curved surface to contact a first side of the cylindrical body and the second bracket includes a second curved surface to contact a second side of the cylindrical body, the first side facing the first wall of the opening, the second side facing the second wall of the opening.

9. The compressor casing of claim 1, wherein the first and second brackets are included in a plurality of brackets, the plurality of brackets surrounding an outer surface of the cylindrical body.

10. A compressor casing, comprising:
a first casing segment;
a second casing segment radially spaced apart from the first casing segment, the second casing segment defining a cavity extending through the second casing segment;
an elongated member connecting the first casing segment to the second casing segment, a first end of the elongated member fixedly coupled to the first casing segment, a second end of the elongated member extending through the cavity of the second casing segment;
a helical spring positioned to surround a portion of the elongated member, the portion of the elongated member positioned between the first and second casing segments, the helical spring engaging with the elongated member to separate the first casing segment and the second casing segment; and
a sleeve portion positioned in the cavity, the sleeve portion at least partially surrounding the elongated member, the sleeve portion retaining the elongated member within the cavity, wherein the helical spring is a first spring, the compressor casing further including:
a second spring positioned between a first wall of the cavity and the sleeve portion; and
a third spring positioned between a second wall of the cavity and the sleeve portion, the second wall facing the first wall, the elongated member held in compression by the sleeve portion and the second and third springs.

11. The compressor casing of claim 10, further including a seat positioned on a surface of the first casing segment, the surface of the first casing segment facing the second casing segment, the seat shaped to receive an end of the elongated member.

12. The compressor casing of claim 11, further including a damper separating the end of the elongated member and the seat.

13. The compressor casing of claim 11, wherein the portion of the elongated member is a first portion, the helical spring positioned between the seat and a second portion of the elongated member, the second portion of the elongated member positioned closer to the second casing segment than the first portion of the elongated member is to the second casing segment, the helical spring engaging with the seat and the second portion of the elongated member to resist radial movement between the first and second casing segments.

14. The compressor casing of claim 10, wherein the sleeve portion is an annular sleeve having an inner annular surface and an outer annular surface, a portion of the inner annular surface in contact with the elongated member, the outer annular surface in contact with the second and third springs.

15. The compressor casing of claim 14, wherein the cavity is a first cavity, wherein the outer annular surface includes a second cavity and a third cavity, walls of the second cavity to partially enclose the second spring and walls of the third cavity to enclose the third spring.

16. The compressor casing of claim 15, further including a first piston ring separating the second spring from the first wall of the first cavity and a second piston ring separating the third spring from the second wall of the first cavity.

17. An apparatus, comprising:
an outer annular compressor casing defining openings extending through the outer annular compressor casing, the openings circumferentially spaced apart along the outer annular compressor casing;
an inner annular compressor casing surrounded by the outer annular compressor casing, the inner annular compressor casing having elongated bolts attached to an outer surface of the inner annular compressor casing, the outer surface facing the outer annular compressor casing, the elongated bolts extending radially away from the outer surface towards the outer annular compressor casing, the elongated bolts extending through corresponding ones of the openings, the elongated bolts engaging with walls of the openings to resist movement between the outer annular compressor, a first end of the elongated bolts attached to the inner annular compressor casing, a second end of the elongated bolts positioned within openings of an outer annular casing, the elongated bolts surrounded by springs, the springs aligned to a longitudinal axis of the elongated bolts, the springs resisting movement between the outer annular compressor casing and the inner annular compressor casing;
a first bracket extending from a first wall of each of the openings towards a second wall of each of the openings; and
a second bracket extending from the second wall towards the first wall, the each of the elongated bolts held in compression by the first and second bracket.

* * * * *